(12) United States Patent
Martens et al.

(10) Patent No.: US 6,350,802 B2
(45) Date of Patent: *Feb. 26, 2002

(54) THERMALLY STABLE FLAME RETARDANT POLYAMIDES

(75) Inventors: Marvin Michael Martens, Vienna, WV (US); Reiko Koshida, Yokohama (JP); Wendy Tobin; Jocelyn M. Willis, both of Kingston (CA)

(73) Assignee: E. I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,871

(22) Filed: Mar. 17, 1999

Related U.S. Application Data

(60) Provisional application No. 60/078,504, filed on Mar. 18, 1998.

(51) Int. Cl.$^7$ .............................. C08K 3/10; C08K 5/09
(52) U.S. Cl. ...................... 524/409; 524/300; 524/432; 524/433; 524/469; 524/470
(58) Field of Search ................... 524/300, 409, 524/432, 433, 469, 470

(56) References Cited

U.S. PATENT DOCUMENTS 5,256,718 A * 10/1993 Yamamoto et al. ......... 524/411

FOREIGN PATENT DOCUMENTS

| JP | 63 150349 A | 6/1988 | ............ C08K/3/22 |
| JP | 07 292242 A | 11/1995 | ............ C08K/3/22 |
| WO | WO 95-18178 A | 7/1995 | ............ C08K/5/03 |

* cited by examiner

*Primary Examiner*—Kriellion A. Sanders

(57) ABSTRACT

Certain polyamide molding compositions are disclosed having improved flame resistance and heat stability. These compositions comprise in weight percent, 20–78% polyamide having a melting point of 280–340° C.; 10–60% inorganic filler; 10–35% flame retardant (brominated or chlorinated); 1–10% antimony compound; 1–10% of one or more oxides, hydroxides, or salts of weak mineral acids, and combinations thereof; and 0–2% heat stabilizer.

11 Claims, No Drawings

THERMALLY STABLE FLAME RETARDANT POLYAMIDES

CROSS REFERENCE TO RELATED APPLICATION

This application claims the benefit of U.S. Provisional Application No. 60/078,504 filed Mar. 18, 1998.

BACKGROUND OF THE INVENTION

1. Field of the Invention

The instant invention relates to improved flame-retardant polyamides. More particularly, this invention relates to polyamides including flame retardants that exhibit both improved flame resistance and thermal stability.

2. Description of Prior Art

One of the major commercial problems with flame retarded high temperature nylon is thermal instability in normal processing (molding) conditions. This leads to heavy mold deposit, plugging of the mold vent and corrosion of the mold. Typical heat stabilizers that would be used in non-flame retardant products do not help this situation.

Surprisingly, it has been discovered that when adding oxides or hydroxides, or salts of weak mineral acids the thermal stability of the product increases dramatically with and without normal heat stabilizers such as halogen compounds, plus an antimony compound synergist.

The theory is that the halogen containing flame-retardant (typically a bromine or chlorine compound) starts to degrade slowly (when in the presence of an antimony compound synergist) at the normal processing temperatures for high melt temperature nylons. One of the degradation products is the acid of the halogen (HCl or HBr). The oxides, hydroxides or salts of weak mineral acids (used as an additive) neutralize the halogen acid that is formed, and prevent acid attack of the polymer which would otherwise lead to volatiles and corrosion.

SUMMARY OF THE INVENTION

There is disclosed and claimed herein polyamide molding compositions having both improved flame resistance and heat stability comprising, in weight percent, (a) 20–78% polyamide, having a melting point of 280–340° C., (b) 10–60% inorganic filler, (c) 10–35% of a flame retardant having 50–70% bromine or chlorine, (d) 1–10% antimony compound, (e) 1–10% of one or more of magnesium oxide calcium oxide, hydroxides, or salts of weak mineral acids, and combinations thereof, and (f) 0–2% of a heat stabilizer.

Polyamide molding compositions as above wherein component (e) is present in an amount of 1–5 weight percent are preferred.

There is further disclosed and claimed herein processes for improving the temperature stability and flame retardance of polyamide resins, comprising the steps of providing a molding composition as above and molding this composition to make a molded part. Molded parts made from such processes are also disclosed and claimed.

DETAILED DESCRIPTION OF THE INVENTION

The polyamide used in this invention may be 20–78% (all percentages are weight percent unless designated otherwise) of any polyamide that has a melting point of from about 280° C. to about 340°. An example of a suitable polyamide is a copolyamide composed of 20–80 mole % of units derived from hexamethylene terephthalamide and 80–20 mole % of units derived from hexamethylene adipamide. This polyamide is referred to hereinafter as 6T/66 copolymer. Other suitable polyamides include polyamides composed of 20–80 mole % of units derived from hexamethylene terephthalamide and 80–20 mole % of units derived from hexamethylene sebacamide, hexamethylene dodecamide, hexamethylene isophthalamide, 2-methylpentamethylene terephthalamide, or mixtures thereof.

There are no particular limitations on the process for the production of the copolyamide used in the composition of the present invention. It may be produced easily by ordinary melt polymerization. One method to produce the copolymer of this invention is an autoclave one-step polymerization process taught in U.S. Pat. No. 5,378,800 which is incorporated by reference herein. That process includes feeding to a reactor an aqueous salt solution of an admixture of desired diacids and diamines, heating the solution under pressure, reducing the pressure, maintaining the reaction mixture at a pressure that is not greater than about atmospheric pressure, and discharging the polyamide from the reactor. An alternative process includes preparing a prepolymer and subjecting the prepolymer to solid-phase polymerization or melt-mixing in an extruder to increase the degree of polymerization. The prepolymer is prepared by heating at 150° C.–320° C. an aqueous solution containing 6T salt (a salt formed from hexamethylenediamine and terephthalic acid) and 66 salt (a salt formed from hexamethylenediamine and adipic acid). An alternative process consists of subjecting 6T salt and 66 salt directly to solid-phase polymerization at a temperature lower than the melting point.

The composition of the present invention contains 10–60% of an inorganic filler or reinforcing agent that includes, for example, fibrous reinforcement such as glass fiber and carbon fiber, glass beads, talc, kaolin, wollastonite and mica. Preferable among them is glass fiber. Glass fibers suitable for use in the present invention are those generally used as a reinforcing agent for thermoplastics resins and thermosetting resins. Preferred glass fiber is in the form of glass rovings, glass chopped strands, and glass yarn made of continuous glass filaments 3–20 micron meters in diameter.

The resin composition of the present invention contains 10–35% of a flame retardant. It is a flame retardant based on brominated polystyrene and/or brominated poly-phenylene ether containing 50–70% by weight bromine. The polystyrene has a weight-average molecular weight higher than 5000, preferably higher than 20,000, and more preferably higher than 28,000. The ether has a molecular weight of at least 6000. An alternate flame retardant is bis(hexachlorocyclopentaieno)cyclooctane, containing approximately 65 wt. % chlorine. A preferred flame retardant is brominated polystyrene or polydibromostyrene. Those having skill in the art will readily appreciate that other flame retardants containing different weight percentages of chlorine are useful in the practice of the invention. Without intending to limit the generality of the foregoing, it is anticipated that the weight percent of chlorine in the flame retardant is expected to be identical to the weight percent range of bromine as identified above.

In a composition according to the present invention, the bromine-containing flame retardant is used in combination with 1–10% of an auxiliary flame retardant that is a specific antimony compound which is selected from the group consisting of antimony trioxide, antimony tetraoxide, antimony pentoxide and sodium antimonate. Sodium antimonate is preferred.

Important to this invention is the presence of 1–10%, preferably 1–5%, of the oxides, hydroxides or salts of weak mineral acids. Hydroxides such as hydrotalcite are useful in this invention. Similarly, salts of weak mineral acids (such as calcium carbonate and zinc borate) function to increase the thermal stability of the product.

Also present may be up to 2% of a heat stabilizer such as copper iodide.

The copolyamide resin of the present invention may have incorporated in it it a variety of additives such as an impact modifier, a viscosity modifier, pigment, dye, antioxidant, and heat resistance improver, in such amounts that they do not harm its characteristic properties.

EXAMPLES

The present invention is illustrated by the following examples and comparative examples.

The nylon used was 6T66 (45/55 molar %) with a melting point of about 315° C.

STAGE 1 EXAMPLES AND COMPARATIVE EXAMPLES

Samples of various compositions were extruded on a 20 mm twin screw extruder (Welding Engineers Inc., Blue Bell, PA.). The material was placed in a glass tube 0.5 inch OD (12 cm) and 24 inch (62 cm) in length and heated at 340° C. for 30 minutes, with a small helium purge. The contents of the heated glass tubes were visually graded for the amount of volatiles which had left the polymer and condensed higher on the glass tube. Off-gases were collected and analyzed. See Table 1.

STAGE 2 EXAMPLES AND COMPARATIVE EXAMPLES

Samples of various compositions were produced on a commercial scale 58 mm twin screw extruder (Werner and Pfleiderer, Ramsey, N.J.) at 600 pounds per hour. Resultant product was analyzed on a thermogravimetric analyzer (DuPont Instruments [Series 951] DuPont Company, Wilmington, Del.), measuring weight retention at 340° C. after a 30 minute hold. Also, samples were tested for standard physical properties following standard ASTM methods. See Table 2.

TABLE 1

Stage 1 Examples (E 1–E 6) and Comparative Examples (CE 1–CE 13)

| Examples (E)/ Comparative Examples (CE) | Nylon | Glass Filler | Base or Buffer[1] | Flame Retard. | Antimony Compounds | Heat Stabilizer | Lubricant | Observation[2] |
|---|---|---|---|---|---|---|---|---|
| CE 1 | 70.0 | 30.0 | — | — | — | — | — | 1 |
| CE 2 | 46.0 | 30.0 | — | 24.0 BR | — | — | — | 2 |
| CE 3 | 45.8 | 30.0 | — | 24.0 BR | — | — | 0.2 | 2 |
| CE 4 | 39.5 | 30.0 | — | 24.0 BR | 5.3 | — | 0.2 | 4 |
| CE 5 | 39.2 | 30.0 | — | 24.0 BR | 5.3 | 0.5 | 0.2 | 4 |
| CE 6 | 40.2 | 30.0 | 0.3B | 24.0 BR | 5.3 | — | 0.2 | 4 |
| CE 7 | 39.5 | 30.0 | 0.5C | 24.0 BR | 5.3 | 0.5 | 0.2 | 4 |
| CE 8 | 44.5 | 30.0 | — | 20.0 BR | 5.3 | — | 0.2 | 4 |
| CE 9 | 43.7 | 30.0 | 0.3A | 20.0 BR | 5.3 | 0.5 | 0.2 | 4 |
| CE 10 | 49.8 | 30.0 | — | 20.0 CL | — | — | 0.2 | 4 |
| CE 11 | 40.4 | 30.0 | 0.15B | 24.0 BR | 5.3 | — | 0.2 | 4 |
| CE 12 | 39.6 | 30.0 | 0.15B, .3A | 24.0 BR | 5.3 | 0.5 | 0.2 | 4 |
| E 1 | 35.9 | 30.0 | 3.0D | 24.0 BR | 5.3 | 0.5 | 0.2 | 2 |
| E 2 | 35.9 | 30.0 | 1.0C, 3.0A, .15B | 24.0 BR | 5.3 | 0.5 | 0.2 | 2 |
| E 3 | 35.9 | 30.0 | 2.0C, 2.0A, .15B | 24.0 BR | 5.3 | 0.5 | 0.2 | 2 |
| E 4 | 33.9 | 30.0 | 3C, 3A, .15B | 24.0 BR | 5.3 | 0.5 | 0.2 | 2 |
| E 5 | 33.9 | 30.0 | 2C, 4A, .15B | 24.0 BR | 5.3 | 0.5 | 0.2 | 2 |
| CE 13 | 33.9 | 30.0 | .3A | 24.0 BR | 5.3 | 0.5 | 0.2 | 4 |
| E 6 | 36.9 | 30.0 | 4.0A | 24.0 BR | 5.3 | 0.5 | 0.2 | 2 |

[1]Components
A- Zinc Borate; B- Hydrotalcite; C- Calcium Oxide; D- Calcium Carbonate.
Antimony Compound- 75% sodium antimonate in Surlyn ® Ionomer Resin (Ethylene Copolymer (Dupont Company, Wilmington, DE)
Heat Stabilizers- Variety of organic and inorganic common heat stabilizers
Hydrotalcite- $Mg_6Al_2(CO_3)(OH)_{16} \cdot (H_2O)_4$
[2]Observation: 1- Little or no volatiles; 2- Minor volatile buildup; 3- Major volatile buildup; 4- Heavy volatile buildup.

TABLE 2

Stage 2 Examples (E 7–E 29) and Comparative Examples (CE 14–CE 15)

| Examples (E)/ Compar. Examp. (CE) | Weight Percents of Compounds | | | | | | | | Properties | | |
|---|---|---|---|---|---|---|---|---|---|---|---|
| | Nylon | Glass | Base or Buffer[1] | Flame Retardant | Antimony Compounds | Heat Stabilizer | Lubricant | Color Concentrate | TGA Retention (%) | Tensile Strength (psi) | Elongation (%) |
| CE 14 | 40.0 | 30.0 | .3A, .15B | 24.0 BR | 5.3 | — | 0.2 | — | 82.4 | 25.7 | 2.1 |
| E 7 | 38.2 | 30.0 | 2.0A, .15B | 24.0 BR | 5.3 | 0.2 | 0.2 | — | 95.7 | 26.4 | 2.2 |
| E 8 | 38.0 | 30.0 | 2.0A, .15B | 24.0 BR | 5.3 | 0.4 | 0.2 | — | 95.8 | 26.6 | 2.2 |
| E 9 | 37.0 | 30.0 | 3.0A, .15B | 24.0 BR | 5.3 | 0.4 | 0.2 | — | 95.7 | 26.4 | 2.2 |
| E 10 | 37.2 | 30.0 | 3.0A, .15B | 24.0 BR | 5.3 | 0.2 | 0.2 | — | 95.4 | 25.9 | 2.1 |
| E 11 | 36.2 | 30.0 | 4.0A, .15B | 24.0 BR | 5.3 | 0.2 | 0.2 | — | 95.5 | 26.0 | 2.1 |
| E 12 | 36.0 | 30.0 | 4.0A, .15B | 24.0 BR | 5.3 | 0.4 | 0.2 | — | 95.6 | 25.6 | 2.1 |
| E 13 | 37.2 | 30.0 | 1.5A, .15B, 1.5E | 24.0 BR | 5.3 | 0.2 | 0.2 | — | 95.5 | 24.6 | 2.0 |
| E 14 | 37.2 | 30.0 | .15B, 3.0E | 24.0 BR | 5.3 | 0.2 | 0.2 | — | 94.3 | 24.1 | 1.9 |
| E 15 | 37.0 | 30.0 | .15B, 3.0E | 24.0 BR | 5.3 | 0.4 | 0.2 | — | 94.3 | 24.3 | 1.9 |
| E 16 | 37.2 | 30.0 | 1.5A, .15B, 1.5F | 24.0 BR | 5.3 | 0.2 | 0.2 | — | 95.6 | 24.1 | 1.9 |
| E 17 | 37.2 | 30.0 | .15B, 3.0F | 24.0 BR | 5.3 | 0.2 | 0.2 | — | 92.7 | 21.8 | 1.7 |
| E 18 | 37.0 | 30.0 | .15B, 3.0F | 24.0 BR | 5.3 | 0.2 | 0.2 | — | 92.4 | 21.7 | 1.5 |
| E 19 | 37.2 | 30.0 | 1.5A, .15B, 1.5C | 24.0 BR | 5.3 | 0.2 | 0.2 | — | 96.0 | 24.6 | 1.9 |
| E 20 | 37.2 | 30.0 | .15B, 3.0C | 24.0 BR | 5.3 | 0.2 | 0.2 | — | 96.7 | 25.2 | 1.9 |
| E 21 | 37.0 | 30.0 | .15B, 3.0C | 24.0 BR | 5.3 | 0.2 | 0.2 | — | 96.4 | 25.4 | 1.9 |
| E 22 | 37.2 | 30.0 | 2.0A, .15B | 24.0 BR | 5.3 | 0.2 | 0.2 | — | 95.7 | 25.8 | 2.0 |
| E 23 | 36.2 | 30.0 | 3.0A, .15B | 24.0 BR | 5.3 | 0.2 | 0.2 | — | 95.3 | 25.7 | 1.9 |
| E 24 | 35.2 | 30.0 | 4.0A, .15B | 24.0 BR | 5.3 | 0.2 | 0.2 | — | 95.8 | 25.5 | 1.9 |
| E 25 | 36.2 | 30.0 | 1.5A, .15B, 1.5F | 24.0 BR | 5.3 | 0.2 | 0.2 | 1.0 | 95.4 | 22.9 | 1.7 |
| E 26 | 36.2 | 30.0 | 1.5A, .15B, 1.5C | 24.0 BR | 5.3 | 0.2 | 0.2 | 1.0 | 96.0 | 24.7 | 1.9 |
| E 27 | 36.2 | 30.0 | 1.5A, .15B, 1.5E | 24.0 BR | 5.3 | 0.2 | 0.2 | 1.0 | 96.1 | 24.8 | 1.9 |
| CE 15 | 39.1 | 30.0 | .3B, .15B | 24.0 BR | 5.3 | 0.0 | 0.2 | 1.0 | 82.1 | 25.5 | 2.0 |
| E 28 | 36.2 | 30.0 | 3.0A, .15B | 24.0 BR | 5.3 | 0.2 | 0.2 | 1.0 | 96.1 | 25.8 | 2.0 |
| E 29 | 35.2 | 30.0 | 4.0A, .15B | 24.0 BR | 5.3 | 0.2 | 0.2 | 1.0 | 95.9 | 27.1 | 2.2 |

[1]Components: A- Zinc Borate; B- Hydrotalcite; C- Calcium Oxide; D- Calcium Carbonate; E- Zinc Oxide; F- Magnesium Oxide.
BR- Brominated Polystyrene or Poly Dibromostyrene
Cl- Bis(hexachlorocyclopentaieno)cyclooctane-Dechloran Plas- Occidental Chemical Corp., Niagara Falls, New York

What is claimed is:

1. A polyamide molding composition which has both improved flame resistance and heat stability comprising, in weight percent,
    (a) 20–78% polyamide, having a melting point of 280–340 C.,
    (b) 10–60% inorganic filler,
    (c) 10–35% of a flame retardant having 50–70% bromine or chlorine,
    (d) 1–10% antimony compound,
    (e) 1–10% of one or more of magnesium oxide, calcium oxide, hydroxides, or salts of weak mineral acids, and combinations thereof, and
    (f) 0–2% of a heat stabilizer.

2. The composition of claim 1 wherein component (a) is a copolyamide of 20–80 mole of units derived from hexamethylene terephthalamide and 80–20 mole % of units derived from hexamethylene adipamide.

3. The composition of claim 1 where in the inorganic filler (b) is selected from the group consisting of glass fiber, carbon fiber, glass beads, talc, kaolin, wollastonite and mica.

4. The composition of claim 1 wherein the flame retardant (c) is selected from the group consisting of brominated polystyrene, polydibromostyrene, and bis (hexachlorocyclopentaieno)cyclooctane.

5. The composition of claim 1 where in the antimony compound (d) is selected from the group consisting of antimony trioxide, antimony tetraoxide, antimony pentoxide, and sodium antimonate.

6. The composition of claim 1 wherein the component (e) is selected from one or more of the group consisting of hydrotalcite, calcium carbonate, and zinc borate.

7. A composition of claim 1 wherein component (e) is 1–5%.

8. A process for improving the temperature stability and flame retardance of a polyamide resin, comprising the steps of:
    providing a molding composition of claim 1, and
    molding the molding composition to make a molded part.

9. A process for improving the temperature stability and flame retardance of a polyamide resin, comprising the steps of:
    providing a molding composition of claim 7, and
    molding the molding composition to make a molded part.

10. A molded part made from the process of claim 8.

11. A molded part made from the process of claim 9.

* * * * *